(12) United States Patent
Wilborn et al.

(10) Patent No.: US 8,867,673 B2
(45) Date of Patent: Oct. 21, 2014

(54) SELECTIVE QUANTIZATION OF DECISION METRICS IN WIRELESS COMMUNICATION

(75) Inventors: Thomas B. Wilborn, San Diego, CA (US); Brian C. Banister, San Diego, CA (US); Sungho Yun, San Diego, CA (US); Supratik Bhattacharjee, San Diego, CA (US); Inyup Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/181,209

(22) Filed: Jul. 12, 2011

(65) Prior Publication Data

US 2012/0033767 A1 Feb. 9, 2012

Related U.S. Application Data

(60) Provisional application No. 61/367,338, filed on Jul. 23, 2010.

(51) Int. Cl.
*H04L 27/06* (2006.01)

(52) U.S. Cl.
USPC ........... 375/341; 375/316; 375/260; 375/231; 375/265; 370/208

(58) Field of Classification Search
USPC .......................................................... 375/341
See application file for complete search history.

(56) References Cited

U.S. PATENT DOCUMENTS

| | | | |
|---|---|---|---|
| 7,555,071 B2 | 6/2009 | Sontowski | |
| 8,270,543 B1 * | 9/2012 | Fattal et al. | 375/341 |
| 2003/0035589 A1 * | 2/2003 | Kim | 382/239 |
| 2003/0088820 A1 * | 5/2003 | Koppelaar | 714/755 |
| 2004/0128592 A1 * | 7/2004 | Park | 714/709 |
| 2005/0025076 A1 | 2/2005 | Chaudhuri et al. | |
| 2007/0258531 A1 | 11/2007 | Chen et al. | |
| 2008/0239940 A1 | 10/2008 | Ye et al. | |
| 2008/0247450 A1 | 10/2008 | Alexander et al. | |
| 2008/0291819 A1 * | 11/2008 | Gho et al. | 370/208 |
| 2010/0135321 A1 | 6/2010 | Kim et al. | |
| 2010/0223522 A1 | 9/2010 | Duggan | |
| 2011/0066912 A1 | 3/2011 | Riess et al. | |

FOREIGN PATENT DOCUMENTS

| | | |
|---|---|---|
| EP | 1187344 A1 | 3/2002 |
| WO | WO2008038879 A1 | 4/2008 |

OTHER PUBLICATIONS

International Search Report and Written Opinion—PCT/US2011/043897—ISA/EPO—Oct. 18, 2011.
Zhang, et al., "Uniform All-Integer Quantization for Irregular LDPC Decoder," 5th International Conference on Wireless Communications, Networking and Mobile Computing, 2009. WiCom '09, Sep. 24-26, 2009, Beijing, pp. 1-4.

* cited by examiner

*Primary Examiner* — Lihong Yu
(74) *Attorney, Agent, or Firm* — Seyfarth Shaw LLP

(57) ABSTRACT

A method for quantizing decision metrics (e.g., log likelihood ratios (LLRs)) for reduction of memory requirements in wireless communication is described. The method includes selecting a quantization algorithm. The quantization algorithm may be selected as a function of a characteristic of a decision metric representative of a transport block received over a communication channel, a characteristic of the transport block, or a condition of the communication channel. The method further includes quantizing the decision metric using the selected quantization algorithm to generate at least one quantized decision metric representative of the transport block. The method further includes storing the quantized decision metric and an indicia of the selected quantization algorithm to enable recovery of the decision metric representative of the transport block prior to decoding.

24 Claims, 6 Drawing Sheets

SELECTIVE QUANTIZATION OF DECISION METRICS IN WIRELESS COMMUNICATION

CROSS-REFERENCE TO RELATED APPLICATION

This application claims the benefit under 35 U.S.C. §119 (e) to U.S. Provisional Patent Application No. 61/367,338, titled "SELECTIVE QUANTIZATION OF LOG LIKELIHOOD RATIOS IN WIRELESS COMMUNICATION", filed on Jul. 23, 2010, in the name of T. B. Wilborn et al. and assigned to the assignee hereof, the disclosure of which is expressly incorporated by reference herein in its entirety.

BACKGROUND

1. Field

Aspects of the present disclosure relate generally to wireless communication systems, and more particularly to quantizing decision metrics (e.g., log likelihood ratios (LLRs)) for reduction of memory requirements in wireless communication nodes.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

Further memory that may be included in a base station and/or UE may be constrained by factors such as cost and UE or base station size. Consequently, improved methods and apparatus for wireless communication are desired.

SUMMARY

According to one aspect of the present disclosure, a method for quantizing decision metrics (e.g., log likelihood ratios (LLRs)) for reduction of memory requirements in wireless communication is described. The method includes selecting a quantization algorithm. The quantization algorithm may be selected as a function of a characteristic of a decision metric representative of a transport block received over a communication channel, a characteristic of the transport block, and/or a condition of the communication channel. The method further includes quantizing the decision metric using the selected quantization algorithm to generate at least one quantized decision metric representative of the transport block. The method further includes storing the quantized decision metric and an indicia of the selected quantization algorithm to enable recovery of the decision metric representative of the transport block prior to decoding.

In another aspect, an apparatus for quantizing decision metrics (e.g., log likelihood ratios (LLRs)) for reduction of memory requirements in wireless communication is described. The apparatus includes at least one processor; and a memory coupled to the at least one processor. The processor(s) is configured to select a quantization algorithm. The quantization algorithm may be selected as a function of a characteristic of a decision metric representative of a transport block received over a communication channel, a characteristic of the transport block, and/or a condition of the communication channel. The processor(s) is configured to quantize the decision metric using the selected quantization algorithm to generate at least one quantized decision metric representative of the transport block. The processor(s) is configured to store the quantized decision metric and an indicia of the selected quantization algorithm to enable recovery of the decision metric representative of the transport block prior to decoding.

In a further aspect, a computer program product for quantizing decision metrics (e.g., log likelihood ratios (LLRs)) for reduction of memory requirements in wireless communication is described. The computer program product includes a computer-readable medium having program code recorded thereon. The computer program product has program code to select a quantization algorithm. The quantization algorithm may be selected as a function of a characteristic of a decision metric representative of a transport block received over a communication channel, a characteristic of the transport block, and/or a condition of the communication channel. The computer program produce also includes program code to quantize the decision metric using the selected quantization algorithm to generate at least one quantized decision metric representative of the transport block. The computer program produce further includes program code to store the quantized decision metric and an indicia of the selected quantization algorithm to enable recovery of the decision metric representative of the transport block prior to decoding.

In another aspect, an apparatus for quantizing decision metrics (e.g., log likelihood ratios (LLRs)) for reduction of memory requirements in wireless communication is described. The apparatus includes means for selecting a quantization algorithm. The quantization algorithm may be selected as a function of a characteristic of a decision metric representative of a transport block received over a communication channel, a characteristic of the transport block, and/or a condition of the communication channel. The apparatus further includes means for quantizing the decision metric using the selected quantization algorithm to generate at least one quantized decision metric representative of the transport block. The apparatus further includes means for storing the quantized decision metric and an indicia of the selected quantization algorithm to enable recovery of the decision metric representative of the transport block prior to decoding.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
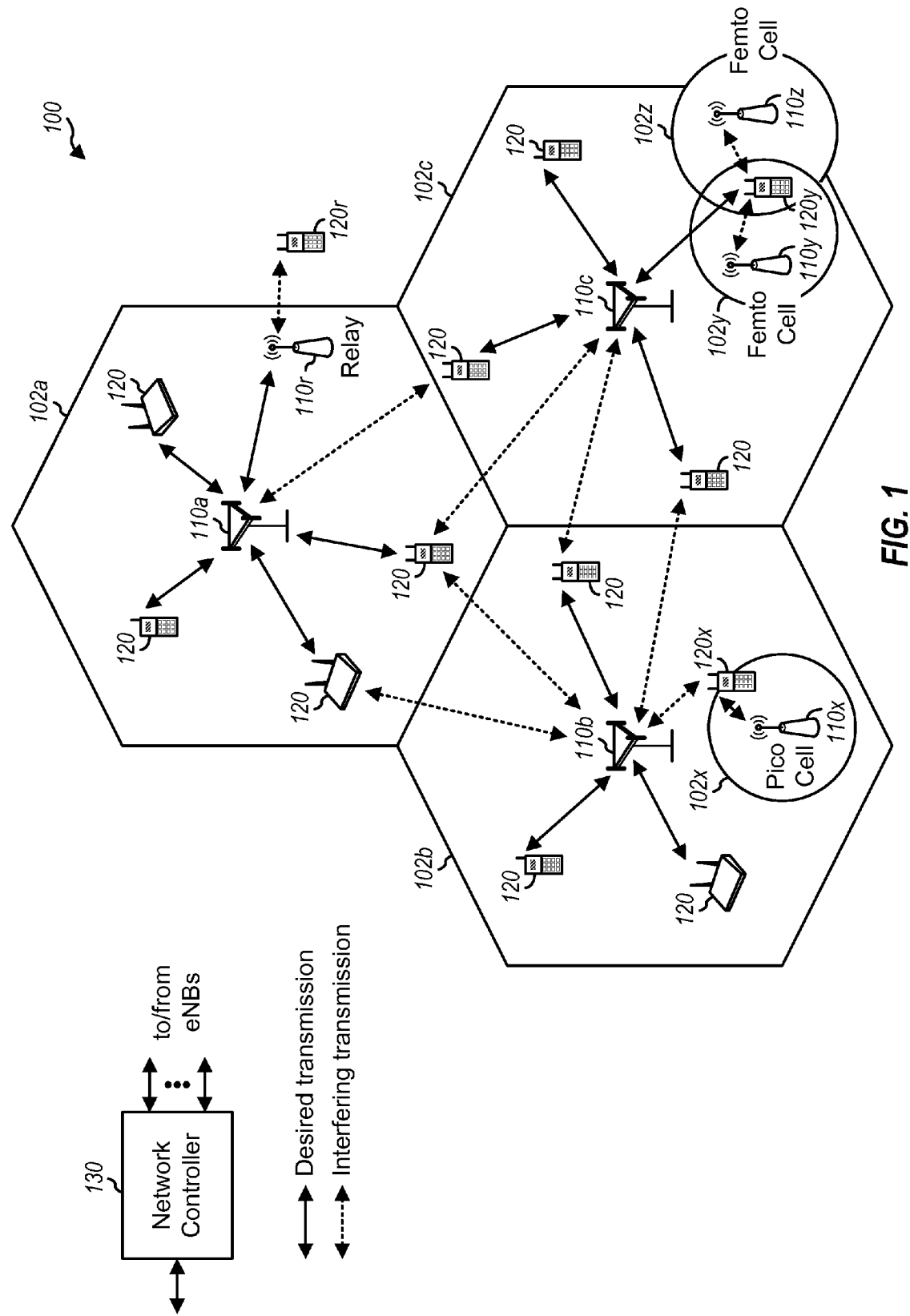
FIG. 1 is a block diagram conceptually illustrating an example of a telecommunications system.

FIG. 1 shows a wireless communication network 100, which may be an LTE-A network, in which selective quantization of Log Likelihood Ratios (LLRs) in a wireless communication network may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
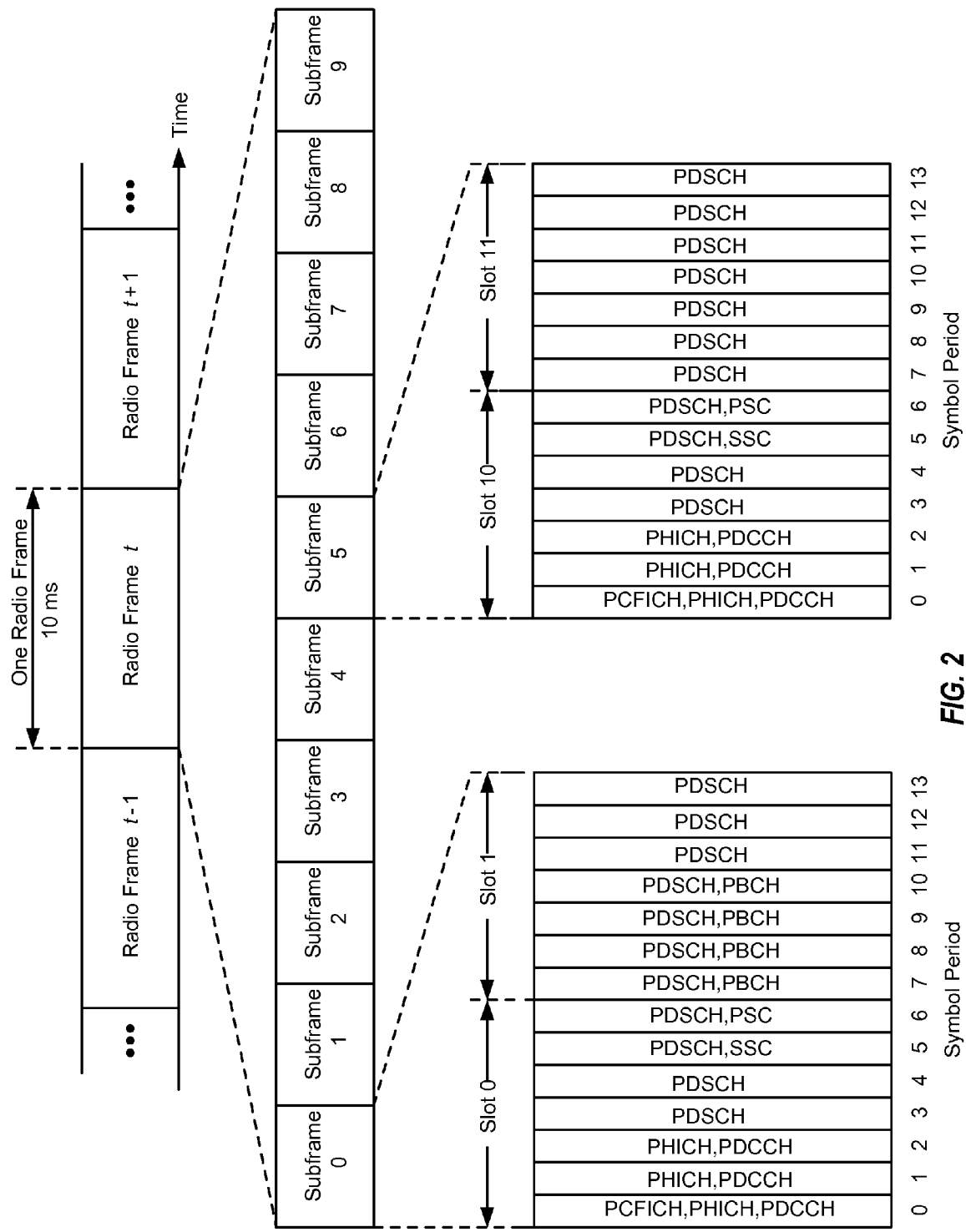
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat reQuest (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
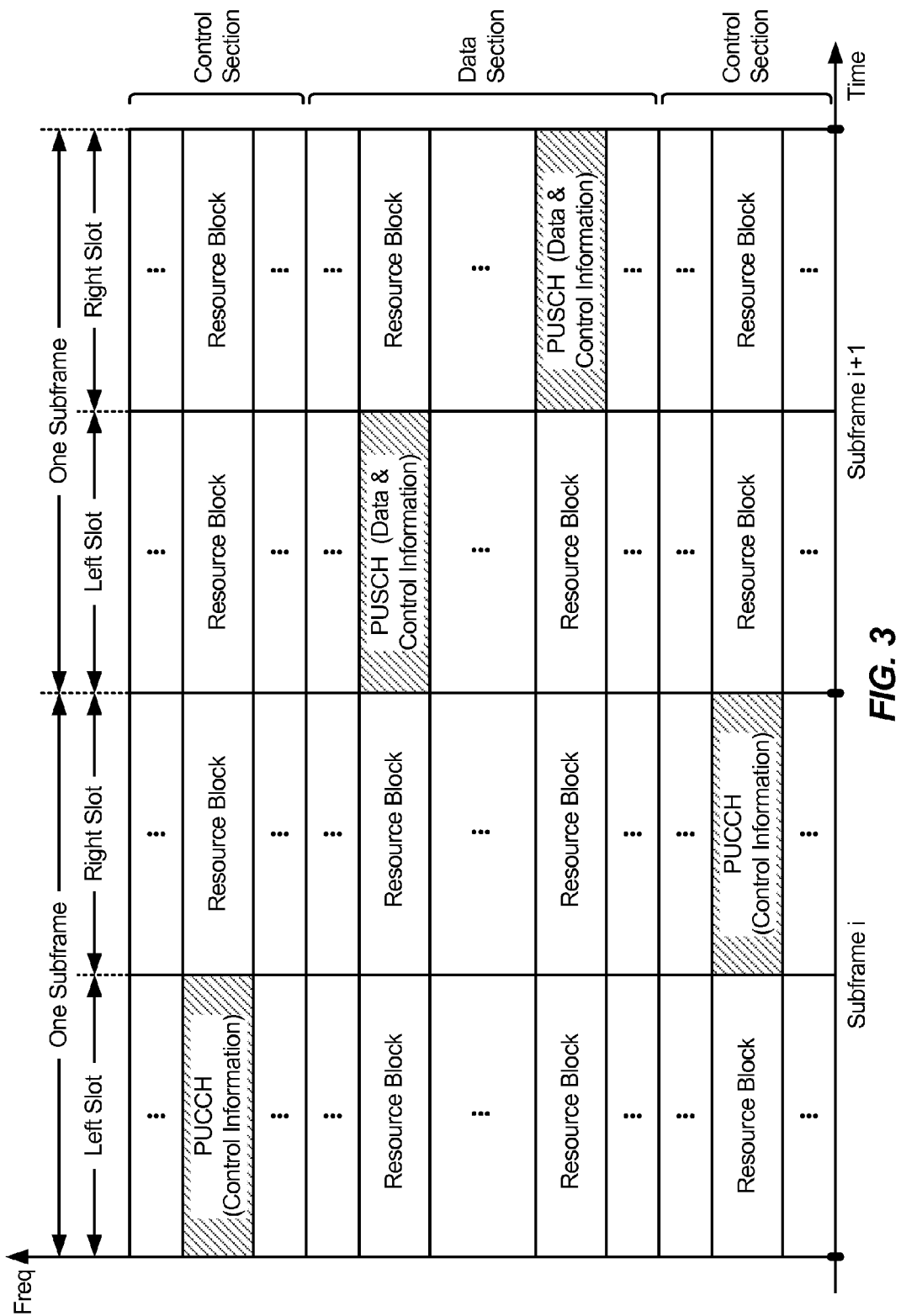
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
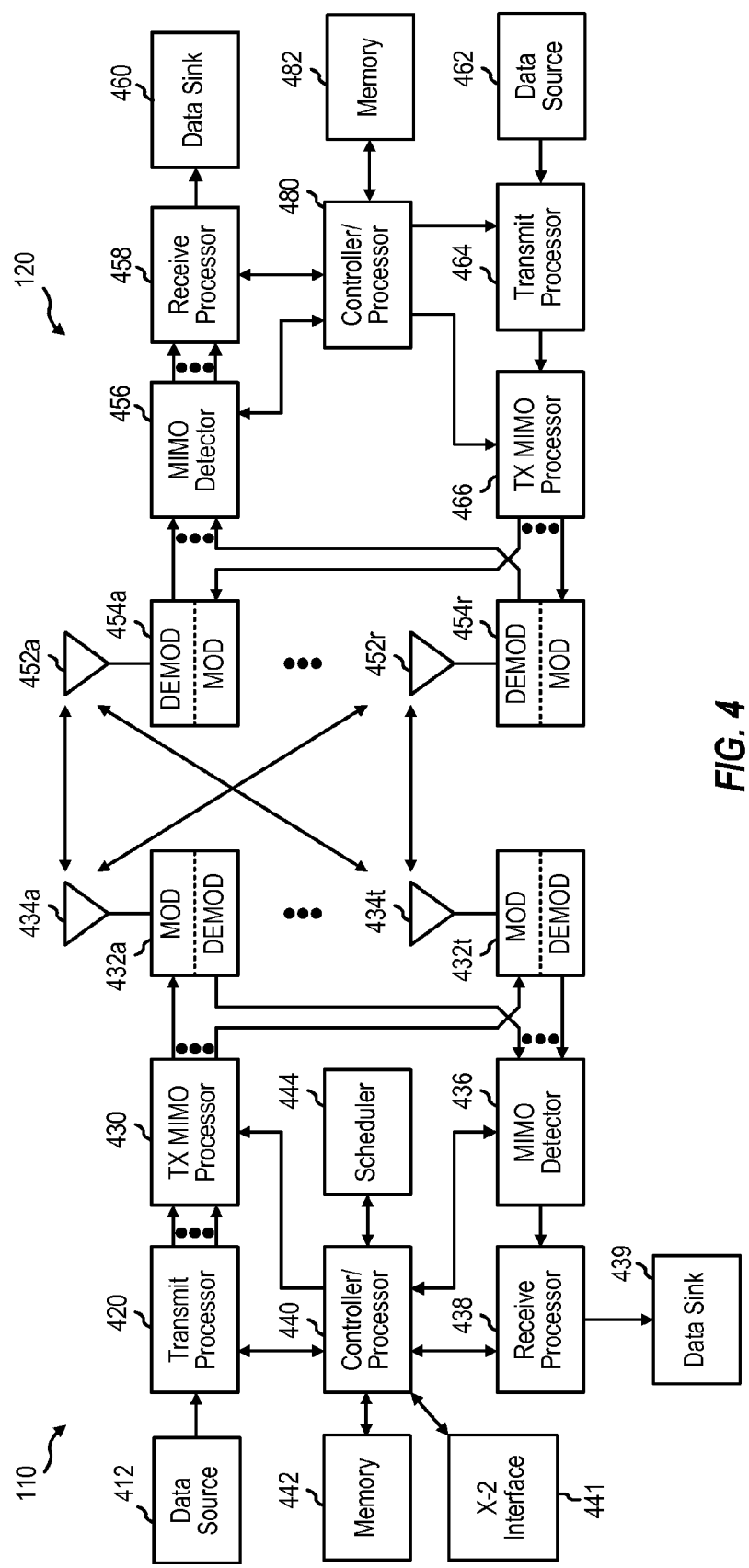
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIGS. 5 and 6, and/or other processes for the techniques described herein. The memories 442 and 482 may store data and program codes for the base station 110 and the UE 120, respectively. A scheduler 444 may schedule UEs for data transmission on the downlink and/or uplink.

Selective Quantization of Log Likelihood Ratios (LLRS) in a Wireless Communication Network In physical layer specifications such as LTE, Evolution-Data Optimized (EV-DO), WCDMA, etc., the mobile station nodes and base station nodes employ a Hybrid Automatic Repeat reQuest (HARQ) scheme to improve data throughput and increase transmission reliability. The HARQ scheme provides transmission reliability by temporarily storing decision metrics that can be combined with subsequent decision metrics from data retransmissions. As described herein, the term "decision metric" may refer to a posterior probability or likelihood (soft value) of transmitted bits being a "0" or a "1" including, but not limited to, log-likelihood ratios (LLRs). Groups of such decision metrics may be used by a decoder to decode a transmitted sequence (e.g., a transport block).

In employing a HARQ scheme nodes use large amounts of memory to combine decision metrics of a corrupted transport block with decision metrics representative of a retransmission of the transport block. In LTE modems which operate at high transmission rates the number of decision metrics which must be stored to ensure successful decoding of corrupted, received packets can be substantial. This drives up the cost, size, and power consumption of the hardware. A substantial portion of the total size of these LTE modems, for example, is dedicated to memory that is used for the HARQ scheme.

Currently, six bits may be allocated to each LLR, which is valued between −31 and +31. According to aspects of the present disclosure the number of bits per LLR may be compressed (for example to two or three bits) thus reducing the memory to implement the HARQ scheme without losing data throughput gains or losing the original decision metrics. Decision metrics, such as LLRs, may be quantized (e.g., in a non-linear manner) in accordance with various quantization algorithms that are selected and/or adapted using knowledge of the decision metric distributions or other characteristics to increase compression of the decision metrics with reduced or minimal information loss.

As described herein, quantization may refer to the process of taking a decision metric that is represented as an N-bit word and representing it by an M-bit word, where M<N. A loss of precision may result when more than one unique N-bit word maps to the same M-bit word. In one aspect, the mapping from an N-bit word to an M-bit word is non-linear (e.g., wordM=scale*wordN is not necessarily true). LLRs are commonly used as decision metrics for decoding. Other types of decision metrics may also be used for decoding.

In many mobile station modem (MSM) designs, six bit symmetric and uniform quantization is applied to each LLR before it is stored in the HARQ buffer. Thus, some large LLRs are saturated to +/−31, while some small LLRs are quantized to 0. In practice, an LLR value of +31 may represent a high likelihood that a received demodulation symbol represents a "1" bit, whereas an LLR value of −31 may represent a high likelihood that a received demodulation symbol represents a "0" bit. Decoding of demodulation symbols becomes problematic when received LLR values fall in between the +31 and −31 values. If a particular data packet is retransmitted as part of a HARQ process, LLR values for retransmissions of a particular bit may be added together, adjusting the probability that the particular bit has a specific value.

In one aspect, the number of LLR bits may be reduced by truncating LLR values, for example, by discarding a certain number of lower bits of the LLR, like the lowest three bits). In one aspect, mu-law compression may be used on the LLRs before quantization as a way to reduce the dynamic range of the LLRs, allowing each to be represented using three bits. The use of mu-law compression may use a reduced amount (e.g., half as much) of the HARQ buffer memory, according to aspects of the present disclosure. LLR compression, either mu-law compression or otherwise, may account for certain LLR or transmission characteristics to determine a desired quantization. Specific parameters for optimizing quantization may include but are not limited to MCS, SINR, LLR variance, LLR conditional mean, LLR conditional variance, code-rate, block size, transmission number in the HARQ process, R/F channel variation over frequency and/or time, or the like.

According to an aspect of the present disclosure, the LLR compression bit width may be changed in accordance with the number of re-transmissions. Because less historical information is available for earlier transmissions, longer bit widths may be used to quantize LLRs for the earlier transmissions and shorter bit widths may be used to quantize the LLRs for the later transmissions.

According to an aspect, the disclosed methods may take advantage of non-uniform distribution of the LLRs. In an illustrative embodiment, a demapper first computes a subset of N LLRs as high-precision values (typically 11 bits or more). The LLRs are then sorted into groups based on their bit index and modulation type. In one aspect, histograms for one or more of the bit groups may be computed.

For example, in the case of 16 Quadrature Amplitude Modulation (QAM), LLRs for the two most significant bits (MSBs) are put into group A, while the other two LLRs are put into group B. This sorting is beneficial because LLRs for the two least significant bits (LSBs) are known to have a distribution with a smaller magnitude, hence having a different optimum quantization scheme. Similarly, in the case of 64 QAM, for example, six bits in a symbol are sorted into three groups with two bits in each group. Histograms for each of the bit groups are generated (e.g., computed). According to an aspect, a different look-up table may be used depending on the grouping of bits and/or depending on the desired mapping of input LLRs to output LLRs.

In one aspect, based on the histogram of the group and the parameters for the transmission, a predefined look-up table (e.g., a compression look-up table) may be selected or the look-up table may be generated on-the-fly. The inputs to the look-up table are the high-precision LLRs (e.g., 11 bits each) from a group. The output of the tables are the low-precision LLRs (e.g., 3 bits each) that are stored in the HARQ buffer from each group. For each group, an index indicating which look-up table was selected for compression, or a set of parameters defining the look-up table that was generated on-the-fly, may also be stored. This information may be used for decompression as the LLRs enter the decoder.

LLRs may have different distributions depending on several transmitter parameters. Multiple look-up tables can be maintained for different parameter sets. Given parameters, a good or optimal look-up table to compress LLRs is selected. Possible parameters for selecting a look-up table include, but are not limited to, modulation and coding scheme (MCS), signal to interference and noise ratio (SINR), and variance of the LLR.

In an illustrative aspect of the present disclosure, the look-up tables for maximizing or increasing mutual information may be computed offline by generating LLR samples for a given a bit group with various signal to noise ratios, modulation orders, and transport block sizes. A sufficient number of samples are generated so that the original LLR distribution can be approximated by a distribution of the samples. A good or optimal look-up table for increasing or maximizing mutual information may then be computed based on the sample distribution.

In another illustrative aspect of the present disclosure, the look-up tables may be adjustable depending on a signal to noise ratio, and a modulation order. A number of different look-up tables are computed for different bit types, MCSs, and signal to noise ratios (SNRs). In this aspect, a table mapping modulation and coding scheme (MCS) indices to the look-up tables may be stored. The look-up tables may be allowed to change further according to the SNR. In particular, a MCS level may be used to indicate the SNR level. For example, if a high MCS level is detected (e.g., based on a high data rate), it may be determined that an SNR level is low. Under such conditions, a desired quantization level may be selected for the low SNR level. Conversely, if a high SNR level is detected, a desired quantization level may be selected for the high SNR level.

In another illustrative aspect of the present disclosure, the look-up table may be generated on-the-fly according to the histogram of received LLRs. A dynamic process to generate the look-up tables may be employed. Once LLRs are received, the histogram is observed and the look-up table may be computed. Then, the parameters defining the look-up table may be stored along with quantized LLRs.

In another illustrative aspect of the present disclosure, the LLR compression bit width may be changed in accordance with the number of re-transmissions. In one aspect, a first transmission (or first few transmissions) may include a subset of the coded bits generated by the encoder for the transport block. As a result, the LLR for the transport block may employ reduced compression for storage within the HARQ memory because the HARQ memory was designed to hold all coded bits (after quantization). Subsequent retransmissions may contain additional coded bits, thus employing additional compression to store information into the HARQ memory. In one aspect, longer compression bit widths may be used to quantize LLRs for the earlier transmissions and shorter compression bit widths may be used to quantize the LLRs for the later transmissions.

Figure 5:
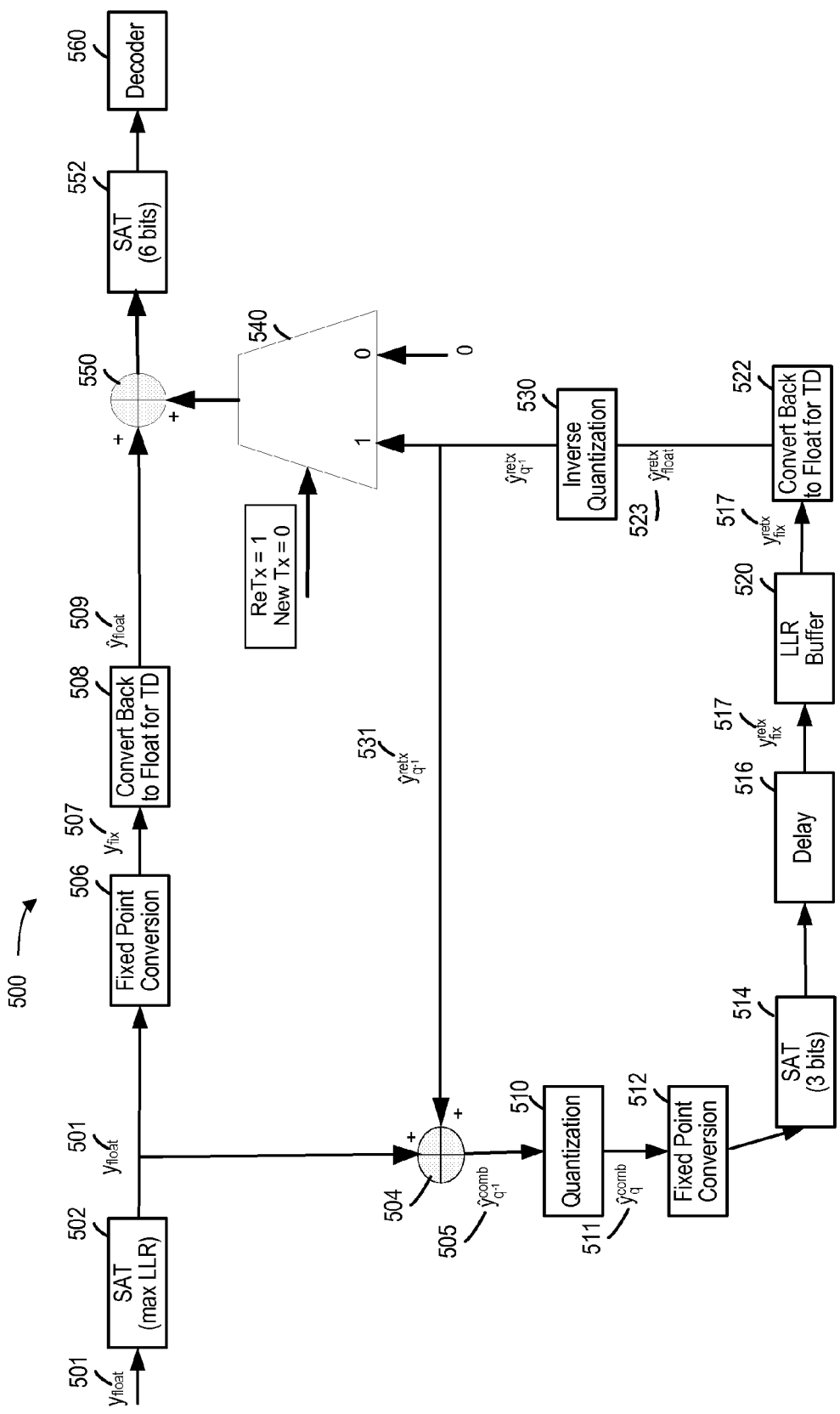
FIG. 5 is a block diagram conceptually illustrating selective quantization of Log Likelihood Ratios (LLRs) in a wireless communication network according to one aspect of the disclosure.

FIG. 5 is a block diagram conceptually illustrating a selective quantization of Log Likelihood Ratios (LLRs) in a wireless communication network according to one aspect of the disclosure. Representatively, a decision metric $y_{float}$ 501 is received at a saturation block 502. In one aspect, the decision metric $y_{float}$ 501 is represented as a maximum saturation value (e.g., an 11-bit LLR value) by the saturation block 502. The decision metric 501 may be combined with a previously stored decision metric $\hat{y}_{q^{-1}}^{retx}$ 531 at a combination block 504 to provide a combined decision metric $\hat{y}_{q^{-1}}^{comb}$ 505. The combined decision metric is quantized at a quantization block 510 using any one of the above-described LLR quantization techniques. Although illustrated as providing an LLR quantization for six-bits to three-bits, it should be recognized by those skilled in the art that other compression bit widths and quantization algorithms are possible while remaining the within the scope of the described aspects and the appended claims.

Referring again to FIG. 5, the quantized LLR value $\hat{y}_{q}^{comb}$ 511 is passed through a fixed point conversion block 512, a saturation block 514 and a delay block 516 to provide a fixed, quantized value $y_{fix}^{retx}$ 517. This fixed, quantized value 517 is stored in an LLR buffer 520 with a compression bit width less than an initial bit width of the input decision metric 501. The fixed, quantized value $y_{fix}^{retx}$ 517 is passed to a conversion block 522 to provide a float LLR value $\hat{y}_{float}^{retx}$ 523. In one aspect, the float LLR value $\hat{y}_{float}^{retx}$ 523 is provided to an inverse quantization block 530. In one aspect, an indicia of the selected quantization algorithm at the quantization block 510 is stored with the fixed, quantized value $y_{fix}^{retx}$ 517 within the LLR buffer 520 to enable recovery of the input decision metric $y_{float}$ 501. Accordingly, the quantization performed according to one aspect of the present disclosure preserves the initial quantization metric $y_{float}$ 501 while reducing the LLR buffer 520 storage requirements, as an example of a selective quantization algorithm.

Referring again to FIG. 5, the inverse quantization block 530 outputs a decision metric $\hat{y}_{q^{-1}}^{retx}$ 531 representative of the input decision metric $y_{float}$ 501 prior to decoding. For retransmissions (ReTx) the decision metric $\hat{y}_{q^{-1}}^{retx}$ 531 is passed through a decision block 540 and combined at a combination block 550. For new transmissions (New Tx), only the decision metric $\hat{y}_{q^{-1}}^{retx}$ 531 is combined at the combination block 550. The other input to the combination block 550 is a decision metric $\hat{y}_{float}$ 509 that is generated from a conversion block 506 as output conversion value $y_{fix}$ 507 and a conversion block 508 to provide the decision metric $\hat{y}_{float}$ 509. The output of the combination block 550 is passed to a saturation block 552 and a decoder 560 such, for example, a turbo decoder.

In one configuration, the selective quantization shown in FIG. 5 allows for a reduced LLR buffer without sacrificing information loss due to LLR quantization. In one aspect, information loss is reduced by storing the quantized decision metric $y_{fix}^{retx}$ 517 and an indicia of the selected quantization algorithm to enable recreation or recovery of the decision metric representative $y_{float}$ 501 of, for example, a transport block prior to decoding. In an alternative aspect, a mu-law conversion and inverse mu-law conversion may be performed at the quantization block 510 and the inverse quantization block 530, respectively, as an example of a fixed quantization algorithm.

Figure 6:
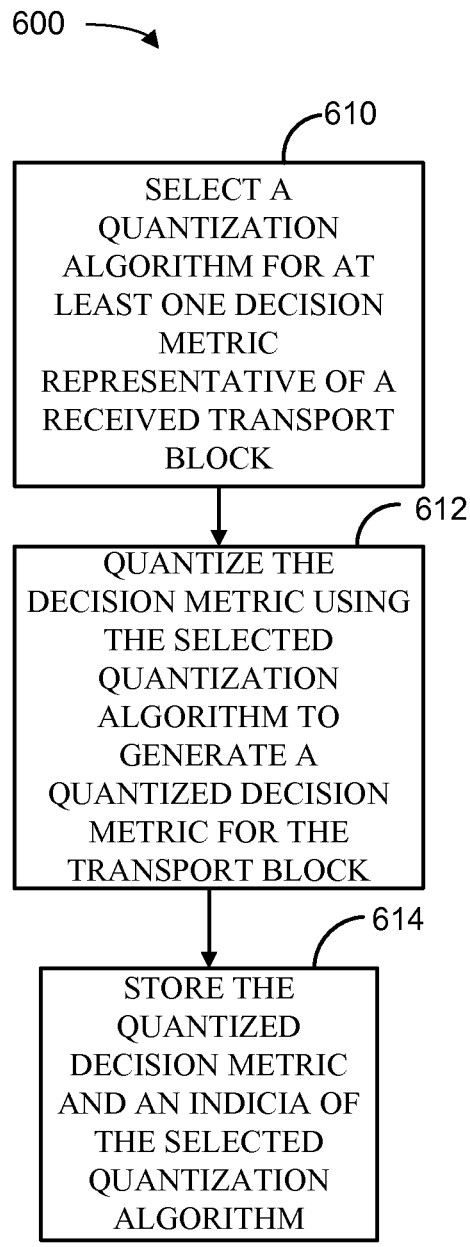
FIG. 6 is a block diagram illustrating a method for selective quantization of Log Likelihood Ratios (LLRs) in a wireless communication network according to one aspect of the disclosure.

FIG. 6 illustrates a method 600 for quantizing log likelihood ratios (LLRs) for reduction of memory requirements in wireless communication according to an aspect of the present disclosure. In block 610, a quantization algorithm is selected. The quantization algorithm may be selected as a function of a characteristic of a decision metric representative of a transport block received over a communication channel, a characteristic of the transport block, and/or a condition of the communication channel. In block 612, the decision metric is quantized using the selected quantization algorithm to generate at least one quantized decision metric representative of the transport block. In block 614, the quantized decision metric and an indicia of the selected quantization algorithm are stored to enable recovery of the decision metric representative of the transport block prior to decoding.

In one configuration, the eNodeB 110 (UE 120) is configured for wireless communication including means for means for selecting, means for quantizing, and means for storing. In one aspect, the selecting means may be the controller/processor 480 and/or the memory 482. The quantizing means may be the controller/processor 480, the memory 482, the receive processor 458, and/or the demodulators 454a-r configured to perform the functions recited by the aforementioned means. The storing means may be the controller/processor 480 and/or the memory 482, the receive processor 458 and the data sink 460. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   selecting a quantization algorithm as a function of at least one of a characteristic of at least one decision metric representative of a transport block received over a communication channel, a characteristic of the transport block, or a condition of the communication channel;
   quantizing the at least one decision metric using the selected quantization algorithm to generate at least one quantized decision metric representative of the transport block;
   storing the at least one quantized decision metric and an indicia of the selected quantization algorithm; and
   recovering the at least one decision metric representative of the transport block from the stored quantized decision metric according to the stored indicia of the selected quantization algorithm prior to decoding, in which a bit width of the at least one decision metric representative of the transport block is greater than a bit width of the stored quantized decision metric, and the selected quantization algorithm selects more bits to represent the quantized decision metric in an initial transmission and fewer bits to represent the quantized decision metric in at least one re-transmission.

2. The method of claim 1, in which the at least one decision metric comprises a log-likelihood ratio (LLR).

3. The method of claim 2, further comprising:
   computing a subset of log likelihood ratios as high-precision values;
   sorting the subset of log likelihood ratios into groups based on their bit index and modulation type; and
   selecting, for each of the groups, a quantization algorithm.

4. The method of claim 3, in which a set of parameters used by the quantization algorithm are generated in real-time and then stored with a group of log likelihood ratios for decompression prior to decoding.

5. The method of claim 3, further comprising:
   computing a histogram for each of the groups; and
   selecting, for each of the groups, a look-up table based on the histogram corresponding to each of the groups.

6. The method of claim 2, wherein the quantization algorithm comprises a look-up table, the method further comprising:
   employing a selected look-up table to generate a corresponding low precision LLR in response to inputting a high precision LLR; and
   storing the low precision LLR in memory along with an index identifying the selected look-up table.

7. The method of claim 6, further comprising:
   for the low precision LLR stored in the memory, employing the index to identify the selected look-up table; and
   applying the identified, selected look-up table in reverse to the low precision LLR to restore the high precision LLR.

8. The method of claim 2, further comprising:
   generating a plurality of parameters for respective values of at least one of modulation and coding schemes (MCSs) or bit types; and selecting a look-up table for the transport block based on at least one of a MCS of the transport block, a size of the transport block, or a look-up table index.

9. The method of claim 2, wherein the quantization algorithm selects more bits to represent LLRs for the initial transmission and fewer bits to represent the LLRs for the at least one re-transmission.

10. The method of claim 1, wherein the at least one decision metric comprises a log-likelihood ratio (LLR), and in which the quantization algorithm comprises one of a compression bit width and a compression look-up table selected based on at least one of a modulation and coding scheme (MCS), a signal to interference and noise ratio (SINR), an LLR mean, or a variance of LLR.

11. An apparatus for wireless communication, comprising:
a memory; and
at least one processor coupled to the memory, the at least one processor being configured:
to select a quantization algorithm as a function of at least one of a characteristic of at least one decision metric representative of a transport block received over a communication channel, a characteristic of the transport block, or a condition of the communication channel;
to quantize the at least one decision metric using the selected quantization algorithm to generate at least one quantized decision metric representative of the transport block;
to store the at least one quantized decision metric and an indicia of the selected quantization algorithm; and
to recover the at least one decision metric representative of the transport block from the stored quantized decision metric according to the stored indicia of the selected quantization algorithm prior to decoding, in which a bit width of the at least one quantized decision metric representative of the transport block is greater than a bit width of the stored decision metric, and the selected quantization algorithm selects more bits to represent the quantized decision metric in an initial transmission and fewer bits to represent the quantized decision metric in at least one re-transmission.

12. The apparatus of claim 11, wherein the at least one decision metric comprises a log-likelihood ratio (LLR).

13. The apparatus of claim 12, wherein the processor is further configured:
to compute a subset of log likelihood ratios as high-precision values;
to sort the subset of log likelihood ratios into groups based on their bit index and modulation type; and
to select, for each of the groups, a quantization algorithm.

14. The apparatus of claim 13, wherein a set of parameters used by the quantization algorithm are generated in real-time and then stored with a group of log likelihood ratios (LLRs) for decompression prior to decoding.

15. The apparatus of claim 13, wherein the processor is further configured:
to compute a histogram for each of the groups; and
to select, for each of the groups, a look-up table based on the histogram corresponding to each of the groups.

16. The apparatus of claim 12, wherein the quantization algorithm comprises a look-up table, and wherein the processor is further configured:
to employ a selected look-up table to generate a corresponding low precision LLR in response to inputting a high precision LLR; and
to store the low precision LLR in the memory along with an index identifying the selected look-up table.

17. The apparatus of claim 16, wherein the processor is further configured:
for the low precision LLR stored in the memory, to employ the index to identify the selected look-up table; and
to apply the identified, selected look-up table in reverse to the low precision LLR to restore the high precision LLR.

18. The apparatus of claim 12, wherein the processor is further configured:
to generate a plurality of parameters for respective values of at least one of modulation and coding schemes (MCSs) or bit types; and
to select a look-up table for the transport block based on at least one of a MCS of the transport block, a size of the transport block, or a look-up table index.

19. The apparatus of claim 12, wherein the quantization algorithm selects more bits to represent LLRs for the initial transmission and fewer bits to represent the LLRs for the at least one re-transmission.

20. The apparatus of claim 11, wherein the at least one decision metric comprises a log-likelihood ratio (LLR), and wherein the quantization algorithm comprises one of a compression bit width and a compression look-up table selected based on at least one of a modulation and coding scheme (MCS), a signal to interference and noise ratio (SINR), an LLR mean, or a variance of LLR.

21. A computer program product for wireless communication in a wireless network, comprising:
a non-transitory computer-readable medium having non-transitory program code recorded thereon, the program code comprising:
program code to select a quantization algorithm as a function of at least one of a characteristic of at least one decision metric representative of a transport block received over a communication channel, a characteristic of the transport block, or a condition of the communication channel;
program code to quantize the at least one decision metric using the selected quantization algorithm to generate at least one quantized decision metric representative of the transport block;
program code to store the at least one quantized decision metric and an indicia of the selected quantization algorithm; and
program code to recover the at least one decision metric representative of the transport block from the stored quantized decision metric according to the stored indicia of the selected quantization algorithm prior to decoding, in which a bit width of the at least one decision metric representative of the transport block is greater than a bit width of the stored quantized decision metric, and the selected quantization algorithm selects more bits to represent the quantized decision metric in an initial transmission and fewer bits to represent the quantized decision metric in at least one re-transmission.

22. The computer program product of claim 21, wherein the at least one decision metric comprises a log-likelihood ratio (LLR), and in which the quantization algorithm comprises one of a compression bit width and a compression look-up table selected based on at least one of a modulation and coding scheme (MCS), a signal to interference and noise ratio (SINR), an LLR mean, or a variance of LLR.

23. An apparatus for wireless communication, comprising:
means for selecting a quantization algorithm as a function of at least one of a characteristic of at least one decision metric representative of a transport block received over a communication channel, a characteristic of the transport block, or a condition of the communication channel;

means for quantizing the at least one decision metric using the selected quantization algorithm to generate at least one quantized decision metric representative of the transport block;

means for storing the at least one quantized decision metric and an indicia of the selected quantization algorithm; and means for recovering the at least one decision metric representative of the transport block from the stored quantized decision metric according to the stored indicia of the selected quantization algorithm prior to decoding, in which a bit width of the at least one decision metric representative of the transport block is greater than a bit width of the stored quantized decision metric, and the selected quantization algorithm selects more bits to represent the quantized decision metric in an initial transmission and fewer bits to represent the quantized decision metric in at least one re-transmission.

24. The apparatus of claim 23, wherein the at least one decision metric comprises a log-likelihood ratio (LLR), and in which the quantization algorithm comprises one of a compression bit width and a compression look-up table selected based on at least one of a modulation and coding scheme (MCS), a signal to interference and noise ratio (SINR), an LLR mean, or a variance of LLR.

* * * * *